United States Patent
Song (10) Patent No.: US 10,564,492 B2
(45) Date of Patent: Feb. 18, 2020

(54) LIQUID CRYSTAL DISPLAY PANEL AND ORIENTATION METHOD THEREOF

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventor: Yanjun Song, Guangdong (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 123 days.

(21) Appl. No.: 15/742,518

(22) PCT Filed: Nov. 16, 2017

(86) PCT No.: PCT/CN2017/111430
§ 371 (c)(1),
(2) Date: Jan. 7, 2018

(87) PCT Pub. No.: WO2019/071710
PCT Pub. Date: Apr. 18, 2019

(65) Prior Publication Data
US 2019/0113794 A1    Apr. 18, 2019

(30) Foreign Application Priority Data

Oct. 12, 2017 (CN) .......................... 2017 1 0948929

(51) Int. Cl.
*G02F 1/1345* (2006.01)
*G02F 1/1335* (2006.01)
(Continued)

(52) U.S. Cl.
CPC ...... *G02F 1/13454* (2013.01); *G02F 1/13458* (2013.01); *G02F 1/133514* (2013.01);
(Continued)

(58) Field of Classification Search
CPC .......... G02F 1/13454; G02F 1/133514; G02F 1/134309
See application file for complete search history.

(56) References Cited

U.S. PATENT DOCUMENTS

| | | | | |
|---|---|---|---|---|
| 2004/0095526 A1* | 5/2004 | Yamabuchi | ....... | G02F 1/133351 349/96 |
| 2008/0012049 A1* | 1/2008 | Niwa | .................. | G01N 27/414 257/253 |
| 2015/0226995 A1* | 8/2015 | Aota | ................ | H01L 23/49816 349/149 |

* cited by examiner

*Primary Examiner* — Lucy P Chien
(74) *Attorney, Agent, or Firm* — Hemisphere Law, PLLC; Zhigang Ma (57) ABSTRACT

A liquid crystal display (LCD) panel and an orientation method thereof are provided. An array substrate of the LCD panel includes signal input pad groups disposed thereon. A color filter substrate of the LCD panel includes first and second electrode portions disposed thereon and respectively electrically connected to the corresponding signal input pad groups. The signal input pads for receiving the same type of input signals are defined as one signal input pad group. The pitch between two adjacent signal input pad groups is determined to be greater than the pitch between two adjacent signal input pads in the same signal input pad group. As a result, under the premise of ensuring good yield of orientation, the design space occupied by the signal input pads can be reduced. The complexity of the probe bar is simplified. The flexibility in tuning the orientation of the LCD panel is enhanced.

8 Claims, 4 Drawing Sheets

(51) Int. Cl.
*G02F 1/1343* (2006.01)
*G02F 1/1333* (2006.01)
(52) U.S. Cl.
CPC .................. *G02F 1/134309* (2013.01); *G02F 2001/133388* (2013.01); *G02F 2202/28* (2013.01)

| S1: Providing a liquid crystal display panel. The liquid crystal display panel comprises an array substrate and a color filter substrate disposed opposite to each other. The array substrate comprises a plurality of signal input pad groups arranged apart from each other on a side of the array substrate facing the color filter substrate. The color filter substrate comprises a first electrode portion and a second electrode portion arranged apart from each other on a side of the color filter substrate facing the array substrate. Each signal input pad group comprises at least one signal input pad. The signal input pads in the same signal input pad group are spaced apart from each other and are configured to receive the same type of input signals. The pitch between two adjacent signal input pads in the same signal input pad group is less than the pitch between two adjacent signal input pad groups.

S2: Determining a signal input pad group for receiving a first orientation signal and another signal input pad group for receiving a second orientation S3: Connecting all signal input pads in each signal input pad group for receiving the first orientation signal to the first electrode portion through a first conductive glue strip, and connecting all signal input pads in each signal input pad group for receiving the second orientation signal to the second electrode portion through a second conductive glue strip.

S4: Applying the first orientation signal and the second orientation signal to the first electrode portion and the second electrode portion through a probe pin, and orientating the liquid crystal display panel through the first orientation signal and the second orientation signal.

FIG. 8

LIQUID CRYSTAL DISPLAY PANEL AND ORIENTATION METHOD THEREOF

RELATED APPLICATIONS

The present application is a National Phase of International Application Number PCT/CN2017/111430, filed on Nov. 16, 2017, and claims the priority of China Application 201710948929.0, filed on Oct. 12, 2017, the entirety of which is incorporated by reference herein.

FIELD OF THE DISCLOSURE

The disclosure relates to a display technical field, and more particularly to a liquid crystal display panel and an orientation method thereof.

BACKGROUND

Liquid crystal display (LCD) is one of the most widely used panel displays. Liquid crystal display panel is the core part of the liquid crystal display. The liquid crystal display panel is usually composed of a color filter substrate (CF Substrate), a thin film transistor array substrate (TFT Array Substrate), and a liquid crystal layer disposed between the two substrates. Generally, the array substrate and the color filter substrate respectively comprise a pixel electrode and a common electrode disposed thereon. When a voltage is applied to the pixel electrode and the common electrode, an electric field is generated in the liquid crystal layer. The electric field determines the orientation of the liquid crystal molecules so as to adjust the polarization of the light incident on the liquid crystal layer. As a result, the liquid crystal display panel displays images.

Based on the operation mode of the liquid crystal, the display modes of the liquid crystal display panel are mainly separated into a phase change (PC) type, a twisted nematic (TN) type, a vertical alignment (VA) type, a in plane switching (IPS) type, and a fringe field switching (FFS) type. Among them, compared to other types of liquid crystal displays, the VA type liquid crystal display has an extremely high contrast. It is quite widely used in large-size display, such as televisions. Polymer-stabilized vertical alignment (PSVA) wide-angle technology is an improved technology of the VA type liquid crystal display panel. It can make the liquid crystal display panel have the advantages of fast response time, high transmittance rate, and so on. It is characterized by the use of an optical orientation method to form polymer protrusions on the surface of the alignment film so that the liquid crystal molecules have a pre-tilt angle.

The process of the conventional optical orientation method for a PSVA liquid crystal display panel generally comprises applying a curing voltage to a pixel electrode and a common electrode of the liquid crystal display panel. At the same time, ultraviolet (UV) light is applied to the liquid crystal display panel. By irradiating UV light, the reactive type monomer in the liquid crystal composition reacts to form polymer protrusions on the surface of the alignment film so that the liquid crystal molecules form a pre-tilt angle. According to different probe locations, there are two conventional ways to realize the application of the curing voltage to the pixel electrode and the common electrode of the liquid crystal display panel. The first type is array probe curing. A side edge of the array substrate is arranged to extend outside of the color filter substrate and be exposed from the color filter substrate. Curing pads are arranged in the extending region and electrically connected to signal input pads of each signal line (including gate lines, data lines, common electrode lines, and so on). Orientation signals are applied to each curing pad through probe pins. Accordingly, applying the curing voltage to the pixel electrode and the common electrode of the liquid crystal display panel is realized. The orientation process is finished. The second type is CF probe curing. A side edge of the color filter substrate is arranged to extend outside of the array substrate and be exposed from the array substrate. The common electrode on the color filter substrate is separated into two electrode portions. The two electrode portions are respectively connected to the signal input pads on the array substrate through two gold glue strips. Orientation signals are applied to the two electrode portions through probe pins. The orientation signals are transmitted to the signal input pads through the two gold glue strips. Accordingly, applying the curing voltage to the pixel electrode and the common electrode of the liquid crystal display panel is realized. The orientation process is finished.

Furthermore, the signal input pads on the conventional array substrate are usually uniformly arranged side by side at regular intervals. The spacing between the two adjacent signal input pads is usually about 1 mm. In the CF probe curing method, the accuracy of coating the gold glue has a limitation. There may be a short circuiting between the gold glue strips connecting different electrode portions. As a result, the orientation may be poor. However, if the pitch between the signal input pads is increased (generally more than 10 mm is needed to effectively avoid short circuiting), the signal input pads occupy too much design space. The complexity of the probe bar is increased.

SUMMARY

An objective of the disclosure is to provide a liquid crystal display panel. Under the premise that good yield of orientation is ensured, the design space occupied by the signal input pads can be reduced. The complexity of the probe bar is simplified. The flexibility in tuning the orientation of the liquid crystal display panel is enhanced.

Another objective of the disclosure is to provide an orientation method of a liquid crystal display panel. Under the premise that good yield of orientation is ensured, the design space occupied by the signal input pads can be reduced. The complexity of the probe bar is simplified. The flexibility in tuning the orientation of the liquid crystal display panel is enhanced.

In order to achieve the objectives above, the disclosure provides a liquid crystal display panel. The liquid crystal display panel comprises an array substrate and a color filter substrate disposed opposite to each other.

The array substrate comprises a plurality of signal input pad groups arranged apart from each other on a side of the array substrate facing the color filter substrate. The color filter substrate comprises a first electrode portion and a second electrode portion arranged apart from each other on a side of the color filter substrate facing the array substrate.

Each signal input pad group comprises at least one signal input pad. The signal input pads in the same signal input pad group are spaced apart from each other and are configured to receive the same type of input signals. The pitch between two adjacent signal input pads in the same signal input pad group is less than the pitch between two adjacent signal input pad groups.

The first electrode portion corresponds to at least one signal input pad group. The second electrode portion corresponds to other signal input pad groups except the signal input pad group corresponding to the first electrode portion. The first electrode portion and the second electrode portion are respectively electrically connected to the corresponding signal input pad groups through a first conductive glue strip and a second conductive glue strip. The first conductive glue strip is connected to all signal input pads in each signal input pad group corresponding to the first electrode portion. The second conductive glue strip is connected to all signal input pads in each signal input pad group corresponding to the second electrode portion.

Each of the array substrate and the color filter substrate comprises a display region and a non-display region on a side of the display region.

The first electrode portion is in the non-display region of the color filter substrate. The second electrode portion covers the display region of the color filter substrate and extends to the non-display region of the color filter substrate. The signal input pad groups are in the non-display region of the array substrate.

The first electrode portion and the second electrode portion are respectively configured to receive a first orientation signal and a second orientation signal from a probe pin. The liquid crystal display panel is orientated through the first orientation signal and the second orientation signal.

The non-display region of the array substrate further comprises a GOA circuit. The signal input pads are electrically connected to the GOA circuit.

The pitch between two adjacent signal input pads is greater than 0.5 mm and less than 5 mm. The pitch between two adjacent signal input pad groups is greater than 5 mm and less than 20 mm.

The disclosure also provides an orientation method of a liquid crystal display panel, comprising the following steps:

Step S1: providing a liquid crystal display panel. The liquid crystal display panel comprises an array substrate and a color filter substrate disposed opposite to each other. The array substrate comprises a plurality of signal input pad groups arranged apart from each other on a side of the array substrate facing the color filter substrate. The color filter substrate comprises a first electrode portion and a second electrode portion arranged apart from each other on a side of the color filter substrate facing the array substrate. Each signal input pad group comprises at least one signal input pad. The signal input pads in the same signal input pad group are spaced apart from each other and are configured to receive the same type of input signals. The pitch between two adjacent signal input pads in the same signal input pad group is less than the pitch between two adjacent signal input pad groups.

Step S2: determining a signal input pad group for receiving a first orientation signal and another signal input pad group for receiving a second orientation signal.

Step S3, connecting all signal input pads in each signal input pad group for receiving the first orientation signal to the first electrode portion through a first conductive glue strip, and connecting all signal input pads in each signal input pad group for receiving the second orientation signal to the second electrode portion through a second conductive glue strip.

Step S4: applying the first orientation signal and the second orientation signal to the first electrode portion and the second electrode portion through a probe pin, and orientating the liquid crystal display panel through the first orientation signal and the second orientation signal.

Each of the array substrate and the color filter substrate comprises a display region and a non-display region on a side of the display region.

The first electrode portion is in the non-display region of the color filter substrate. The second electrode portion covers the display region of the color filter substrate and extends to the non-display region of the color filter substrate. The signal input pad groups are in the non-display region of the array substrate.

The non-display region of the array substrate further comprises a GOA circuit. The signal input pads are electrically connected to the GOA circuit.

The pitch between two adjacent signal input pads is greater than 0.5 mm and less than 5 mm. The pitch between two adjacent signal input pad groups is greater than 5 mm and less than 20 mm.

The disclosure further provides a liquid crystal display panel. The liquid crystal display panel comprises an array substrate and a color filter substrate disposed opposite to each other.

The array substrate comprises a plurality of signal input pad groups arranged apart from each other on a side of the array substrate facing the color filter substrate. The color filter substrate comprises a first electrode portion and a second electrode portion arranged apart from each other on a side of the color filter substrate facing the array substrate.

Each signal input pad group comprises at least one signal input pad. The signal input pads in the same signal input pad group are spaced apart from each other and are configured to receive the same type of input signals. The pitch between two adjacent signal input pads in the same signal input pad group is less than the pitch between two adjacent signal input pad groups.

The first electrode portion corresponds to at least one signal input pad group. The second electrode portion corresponds to other signal input pad groups except the signal input pad group corresponding to the first electrode portion. The first electrode portion and the second electrode portion are respectively electrically connected to the corresponding signal input pad groups through a first conductive glue strip and a second conductive glue strip. The first conductive glue strip is connected to all signal input pads in each signal input pad group corresponding to the first electrode portion. The second conductive glue strip is connected to all signal input pads in each signal input pad group corresponding to the second electrode portion.

Wherein each of the array substrate and the color filter substrate comprises a display region and a non-display region on a side of the display region. The first electrode portion is in the non-display region of the color filter substrate. The second electrode portion covers the display region of the color filter substrate and extends to the non-display region of the color filter substrate. The signal input pad groups are in the non-display region of the array substrate.

Wherein the first electrode portion and the second electrode portion are respectively configured to receive a first orientation signal and a second orientation signal from a probe pin. The liquid crystal display panel is orientated through the first orientation signal and the second orientation signal.

Wherein the non-display region of the array substrate further comprises a GOA circuit. The signal input pads are electrically connected to the GOA circuit.

Wherein the pitch between two adjacent signal input pads is greater than 0.5 mm and less than 5 mm. The pitch between two adjacent signal input pad groups is greater than 5 mm and less than 20 mm.

The beneficial effects of the disclosure are as follows:

A liquid crystal display panel is provided. The liquid crystal display panel comprises an array substrate and a color filter substrate disposed opposite to each other. The array substrate comprises a plurality of signal input pad groups disposed thereon. The color filter substrate comprises a first electrode portion and a second electrode portion disposed thereon. The first electrode portion and the second electrode portion are spaced apart from each other. Each signal input pad group includes at least one signal input pad. The first electrode portion and the second electrode portion are respectively electrically connected to the corresponding signal input pad groups through a first conductive glue strip and a second conductive glue strip. The signal input pads for receiving the same type of input signals are defined as one signal input pad group. The pitch between two adjacent signal input pad groups is determined to be greater than the pitch between two adjacent signal input pads in the same signal input pad group. As a result, under the premise that good yield of orientation is ensured, the design space occupied by the signal input pads can be reduced. The complexity of the probe bar is simplified. The flexibility in tuning the orientation of the liquid crystal display panel is enhanced. An orientation method of a liquid crystal display panel is also provided. Under the premise that good yield of orientation is ensured, the design space occupied by the signal input pads can be reduced. The complexity of the probe bar is simplified. The flexibility in tuning the orientation of the liquid crystal display panel is enhanced.

BRIEF DESCRIPTION OF THE DRAWINGS

In order to further understand the features and technical contents of the disclosure, the detailed descriptions and the accompanying drawings of the disclosure are provided as follows. However, the drawings are only for reference and illustration, and are not intended to limit the disclosure.

In the drawings:

FIG. 8 is a flowchart of an orientation method of a liquid crystal display panel of the disclosure.

DETAILED DESCRIPTION OF PREFERRED EMBODIMENTS

In order to further illustrate the technical means and their effects of the disclosure, the preferred embodiments of the disclosure will be described in detail with reference to accompanying drawings as follows.

Figure 1:
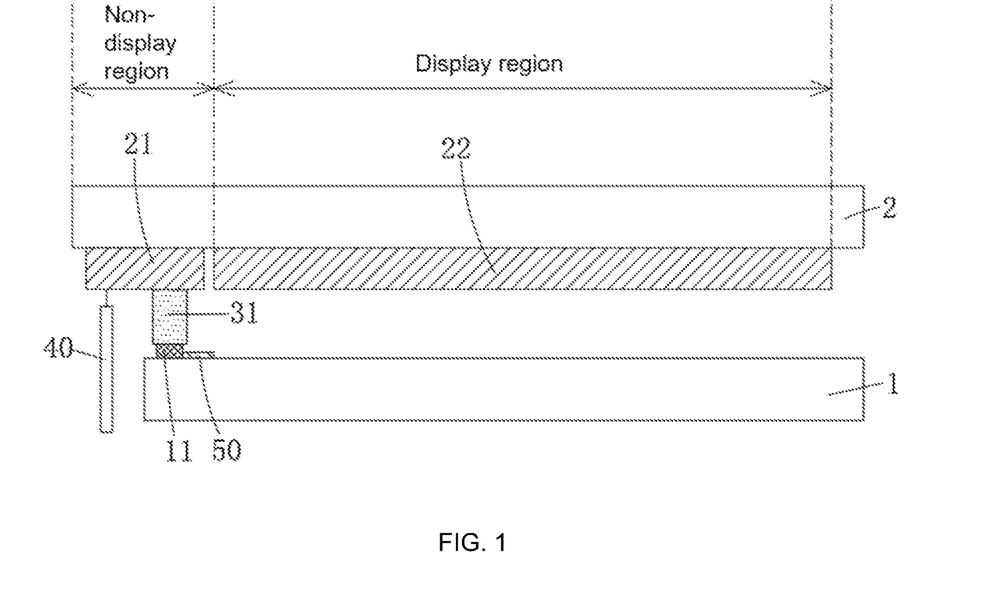
FIG. 1 is a front view of a liquid crystal display panel of the disclosure.
Figure 2:
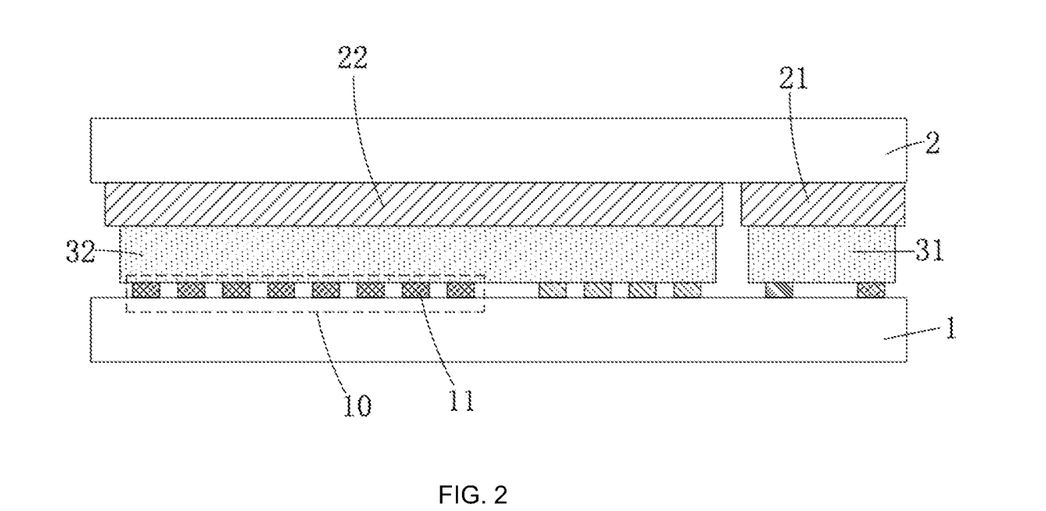
FIG. 2 is a side view of a liquid crystal display panel of the disclosure.
Figure 3:
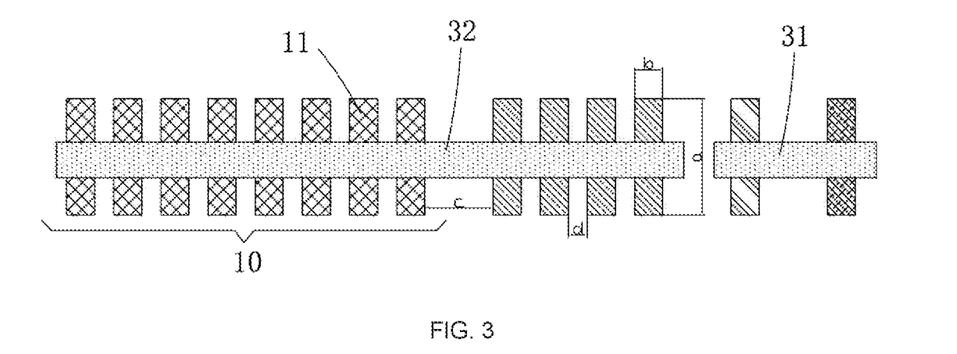
FIG. 3 is a distribution diagram of signal input pad groups according to a first embodiment of a liquid crystal display panel of the disclosure.

Referring to FIG. 1 to FIG. 3, a liquid crystal display panel according to a first embodiment of the disclosure is provided. The liquid crystal display panel comprises an array substrate 1 and a color filter substrate 2 disposed opposite to each other.

The array substrate 1 comprises a plurality of signal input pad groups 10 arranged apart from each other on a side of the array substrate 1 facing the color filter substrate 2. The color filter substrate 2 comprises a first electrode portion 21 and a second electrode portion 22 arranged apart from each other on a side of the color filter substrate 2 facing the array substrate 1.

Each signal input pad group 10 comprises at least one signal input pad 11. The signal input pads 11 in the same signal input pad group 10 are spaced apart from each other and are configured to receive the same type of input signals. The pitch between two adjacent signal input pads 11 in the same signal input pad group 10 is less than the pitch between two adjacent signal input pad groups 10.

The first electrode portion 21 corresponds to at least one signal input pad group 10. The second electrode portion 22 corresponds to other signal input pad groups 10 except the signal input pad group 10 corresponding to the first electrode portion 21. The first electrode portion 21 and the second electrode portion 22 are respectively electrically connected to the corresponding signal input pad groups 10 through a first conductive glue strip 31 and a second conductive glue strip 32. The first conductive glue strip 31 is connected to all signal input pads 11 in each signal input pad group 10 corresponding to the first electrode portion 21. The second conductive glue strip 32 is connected to all signal input pads 11 in each signal input pad group 10 corresponding to the second electrode portion 22.

Specifically, each of the array substrate 1 and the color filter substrate 2 comprises a display region and a non-display region on a side of the display region. The first electrode portion 21 is in the non-display region of the color filter substrate 2. The second electrode portion 22 covers the display region of the color filter substrate 2 and extends to the non-display region of the color filter substrate 2. The signal input pad groups 10 are in the non-display region of the array substrate 1.

Specifically, the first electrode portion 21 and the second electrode portion 22 are respectively configured to receive a first orientation signal and a second orientation signal from a probe pin 40. The liquid crystal display panel is orientated through the first orientation signal and the second orientation signal.

Furthermore, the non-display region of the color filter substrate 2 has a protruding edge relative to the non-display region of the array substrate 1. The protruding edge extends outside of the non-display region of the array substrate 1 and is not covered by the array substrate 1. The first electrode portion 21 and the second electrode portion 22 extend on the protruding edge so as to facilitate applying the first orientation signal and the second orientation signal to the first electrode portion 21 and the second electrode portion 22 through the probe pin 40.

Furthermore, the first electrode portion 21 and the second electrode portion 22 can be obtained by performing laser cutting on the common electrode covering the entire surface of the color filter substrate 2.

Specifically, the non-display region of the array substrate 1 further comprises a GOA (gate driver on array) circuit 50. The signal input pads 11 are electrically connected to the GOA circuit 50. Furthermore, the display region of the array substrate 1 further comprises a plurality of horizontal scan lines, a plurality of vertical data lines, and a plurality of horizontal common electrode lines disposed thereon. The GOA circuit 50 is further electrically connected to the scan lines. The signal input pads 11 are further electrically connected to the data lines and the common electrode lines so that the corresponding signals can be applied to the GOA circuit 50, the data lines and the common electrode lines through the signal input pads 11.

Preferably, the pitch between two adjacent signal input pads 11 is greater than 0.5 mm and less than 5 mm. The pitch between two adjacent signal input pad groups 10 is greater than 5 mm and less than 20 mm. The first conductive glue strip 31 and the second conductive glue strip 32 are both gold (Au) glue strips. The signal input pads 11 have a width of 2 to 8 mm and a height of 2 to 8 mm. As shown in FIG. 3, the distance indicated by a is the height of the signal input pads 11. The distance indicated by b is the width of the signal input pads 11. The distance indicated by c is the pitch between two adjacent signal input pad groups 10. The distance indicated by d is the pitch between two adjacent signal input pads 11.

It should be noted that the number of the signal input pad groups 10, the number of the signal input pads 11 included in each signal input pad group 10, the number of the first conductive glue strip 31, and the number of the second conductive glue strip 32 can be corresponding arranged according to requirements. Therefore, the best orientation effect can be obtained. In other words, in the disclosure, the first conductive glue strip 31 and the second conductive glue strip 32 are arranged to be connected to different signal input pad groups 10. As a result, under the premise of providing only two kinds of orientation signals, different orientation signals can be provided to the signal input pads 11 of the array substrate 1. The flexibility in tuning the orientation is enhanced.

Specifically, as shown in FIG. 3, in the first embodiment of the disclosure, the liquid crystal display panel comprises four signal input pad groups 10, which are the first, second, third and fourth signal input pad groups 10. The first conductive glue strip 31 is connected to the third and fourth signal input pad groups 10. The second conductive glue strip 32 is connected to the first and second signal input pad groups 10. Accordingly, to perform the orientation process, the first orientation signal is applied to the third and fourth signal input pad groups 10. The second orientation signal is applied to the first and second signal input pad groups 10.

Figure 4:
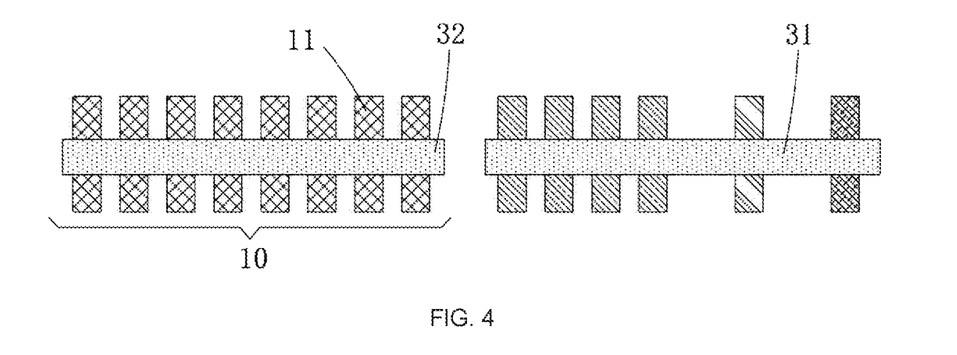
FIG. 4 is a distribution diagram of signal input pad groups according to a second embodiment of a liquid crystal display panel of the disclosure.

Specifically, as shown in FIG. 4, in the second embodiment of the disclosure, different from the first embodiment, the first conductive glue strip 31 is connected to the second, third and fourth signal input pad groups 10. The second conductive glue strip 32 is connected to the first signal input pad group 10. Accordingly, to perform the orientation process, the first orientation signal is applied to the second, third and fourth signal input pad groups 10. The second orientation signal is applied to the first signal input pad group 10.

Figure 5:
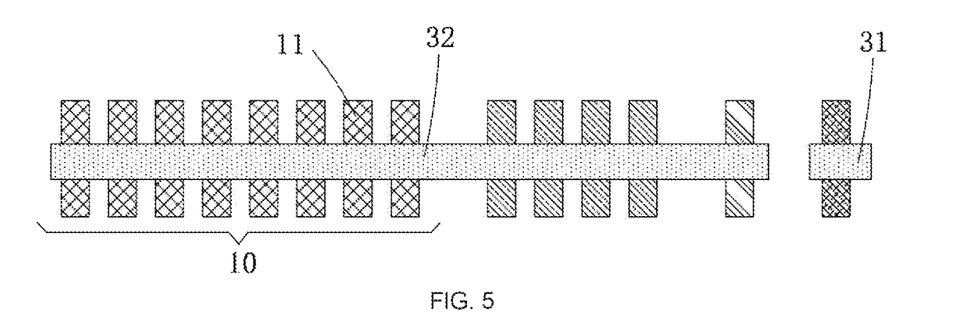
FIG. 5 is a distribution diagram of signal input pad groups according to a third embodiment of a liquid crystal display panel of the disclosure.

Specifically, as shown in FIG. 5, in the third embodiment of the disclosure, different from the first embodiment, the first conductive glue strip 31 is connected to the fourth signal input pad group 10. The second conductive glue strip 32 is connected to the first, second and third signal input pad groups 10. Accordingly, to perform the orientation process, the first orientation signal is applied to the fourth signal input pad group 10. The second orientation signal is applied to the first, second and third signal input pad groups 10.

Figure 6:
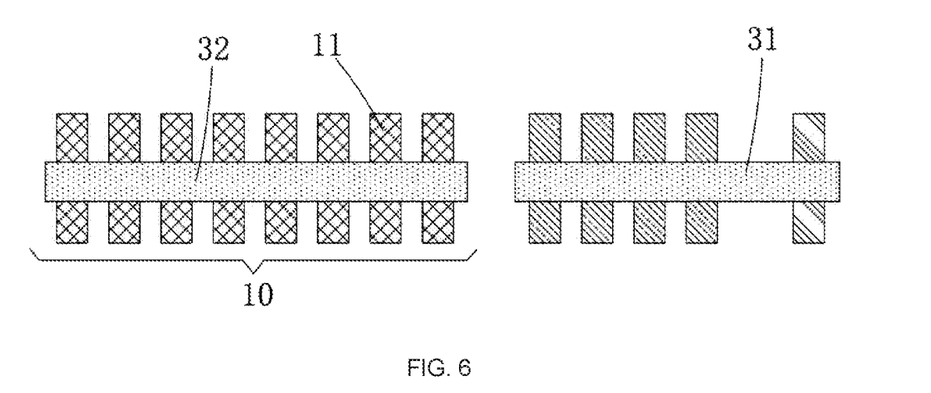
FIG. 6 is a distribution diagram of signal input pad groups according to a fourth embodiment of a liquid crystal display panel of the disclosure.

Specifically, as shown in FIG. 6, in the fourth embodiment of the disclosure, the liquid crystal display panel comprises three signal input pad groups 10, which are the first, second and third signal input pad groups 10. The first conductive glue strip 31 is connected to the second and third signal input pad groups 10. The second conductive glue strip 32 is connected to the first signal input pad group 10. Accordingly, to perform the orientation process, the first orientation signal is applied to the second and third signal input pad groups 10. The second orientation signal is applied to the first signal input pad group 10.

Figure 7:
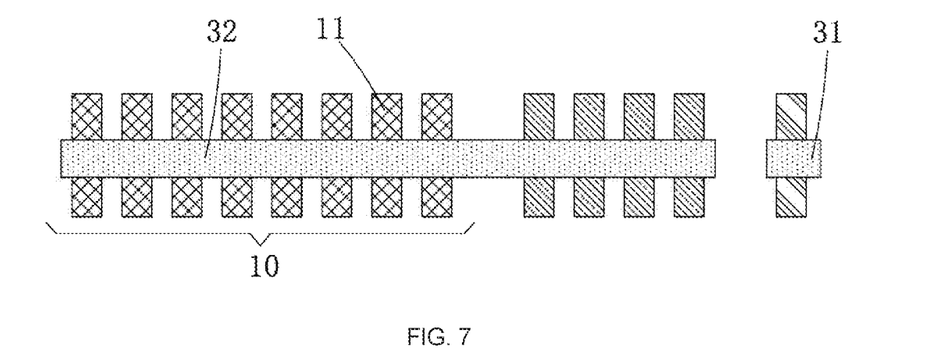
FIG. 7 is a distribution diagram of signal input pad groups according to a fifth embodiment of a liquid crystal display panel of the disclosure.

Specifically, as shown in FIG. 7, in the fifth embodiment of the disclosure, the liquid crystal display panel comprises three signal input pad groups 10, which are the first, second and third signal input pad groups 10. The first conductive glue strip 31 is connected to the third signal input pad group 10. The second conductive glue strip 32 is connected to the first and second signal input pad groups 10. Accordingly, to perform the orientation process, the first orientation signal is applied to the third signal input pad group 10. The second orientation signal is applied to the first and second signal input pad groups 10.

Referring to FIG. 8, the disclosure further provides an orientation method of a liquid crystal display panel, comprising the following steps:

Step S1: providing a liquid crystal display panel. The liquid crystal display panel comprises an array substrate 1 and a color filter substrate 2 disposed opposite to each other. The array substrate 1 comprises a plurality of signal input pad groups 10 arranged apart from each other on a side of the array substrate 1 facing the color filter substrate 2. The color filter substrate 2 comprises a first electrode portion 21 and a second electrode portion 22 arranged apart from each other on a side of the color filter substrate 2 facing the array substrate 1. Each signal input pad group 10 comprises at least one signal input pad 11. The signal input pads 11 in the same signal input pad group 10 are spaced apart from each other and are configured to receive the same type of input signals. The pitch between two adjacent signal input pads 11 in the same signal input pad group 10 is less than the pitch between two adjacent signal input pad groups 10.

Specifically, each of the array substrate 1 and the color filter substrate 2 comprises a display region and a non-display region on a side of the display region. The first electrode portion 21 is in the non-display region of the color filter substrate 2. The second electrode portion 22 covers the display region of the color filter substrate 2 and extends to the non-display region of the color filter substrate 2. The signal input pad groups 10 are in the non-display region of the array substrate 1.

Furthermore, the non-display region of the color filter substrate 2 has a protruding edge relative to the non-display region of the array substrate 1. The protruding edge extends outside of the non-display region of the array substrate 1 and is not covered by the array substrate 1. The first electrode portion 21 and the second electrode portion 22 extend on the protruding edge so as to facilitate applying the first orientation signal and the second orientation signal to the first electrode portion 21 and the second electrode portion 22 through the probe pin 40.

Furthermore, the first electrode portion 21 and the second electrode portion 22 can be obtained by performing laser cutting on the common electrode covering the entire surface of the color filter substrate 2.

Specifically, the non-display region of the array substrate 1 further comprises a GOA circuit 50. The signal input pads 11 are electrically connected to the GOA circuit 50. Furthermore, the display region of the array substrate 1 further comprises a plurality of horizontal scan lines, a plurality of vertical data lines, and a plurality of horizontal common electrode lines disposed thereon. The GOA circuit 50 is further electrically connected to the scan lines. The signal input pads 11 are further electrically connected to the data lines and the common electrode lines so that the corresponding signals can be applied to the GOA circuit 50, the data lines and the common electrode lines through the signal input pads 11.

Preferably, the pitch between two adjacent signal input pads 11 is greater than 0.5 mm and less than 5 mm. The pitch between two adjacent signal input pad groups 10 is greater than 5 mm and less than 20 mm. The first conductive glue strip 31 and the second conductive glue strip 32 are both gold (Au) glue strips. The signal input pads 11 have a width of 2 to 8 mm and a height of 2 to 8 mm. As shown in FIG. 3, the distance indicated by a is the height of the signal input pads 11. The distance indicated by b is the width of the signal input pads 11. The distance indicated by c is the pitch between two adjacent signal input pad groups 10. The distance indicated by d is the pitch between two adjacent signal input pads 11.

Step S2: determining a signal input pad group 10 for receiving a first orientation signal and another signal input pad group 10 for receiving a second orientation signal.

Step S3, connecting all signal input pads 11 in each signal input pad group 10 for receiving the first orientation signal to the first electrode portion 21 through the first conductive glue strip 31, and connecting all signal input pads 11 in each signal input pad group 10 for receiving the second orientation signal to the second electrode portion 22 through the second conductive glue strip 32.

Step S4: applying the first orientation signal and the second orientation signal to the first electrode portion 21 and the second electrode portion 22 through the probe pin 40, and orientating the liquid crystal display panel through the first orientation signal and the second orientation signal.

It should be noted that the number of the signal input pad groups 10, the number of the signal input pads 11 included in each signal input pad group 10, and which of the signal input pad groups 10 is specifically connected to the first conductive glue strip 31 and the second conductive glue strip 32 can be corresponding arranged according to requirements. Therefore, the best orientation effect can be obtained. In other words, in the disclosure, the first conductive glue strip 31 and the second conductive glue strip 32 are arranged to be connected to different signal input pad groups 10. As a result, under the premise of providing only two kinds of orientation signals, different orientation signals can be provided to the signal input pads 11 of the array substrate 1. The flexibility in tuning the orientation is enhanced.

Specifically, as shown in FIG. 3, in the first embodiment of the disclosure, the liquid crystal display panel comprises four signal input pad groups 10, which are the first, second, third and fourth signal input pad groups 10. The first conductive glue strip 31 is connected to the third and fourth signal input pad groups 10. The second conductive glue strip 32 is connected to the first and second signal input pad groups 10. Accordingly, to perform the orientation process, the first orientation signal is applied to the third and fourth signal input pad groups 10. The second orientation signal is applied to the first and second signal input pad groups 10.

Specifically, as shown in FIG. 4, in the second embodiment of the disclosure, different from the first embodiment, the first conductive glue strip 31 is connected to the second, third and fourth signal input pad groups 10. The second conductive glue strip 32 is connected to the first signal input pad group 10. Accordingly, to perform the orientation process, the first orientation signal is applied to the second, third and fourth signal input pad groups 10. The second orientation signal is applied to the first signal input pad group 10.

Specifically, as shown in FIG. 5, in the third embodiment of the disclosure, different from the first embodiment, the first conductive glue strip 31 is connected to the fourth signal input pad group 10. The second conductive glue strip 32 is connected to the first, second and third signal input pad groups 10. Accordingly, to perform the orientation process, the first orientation signal is applied to the fourth signal input pad group 10. The second orientation signal is applied to the first, second and third signal input pad groups 10.

Specifically, as shown in FIG. 6, in the fourth embodiment of the disclosure, the liquid crystal display panel comprises three signal input pad groups 10, which are the first, second and third signal input pad groups 10. The first conductive glue strip 31 is connected to the second and third signal input pad groups 10. The second conductive glue strip 32 is connected to the first signal input pad group 10. Accordingly, to perform the orientation process, the first orientation signal is applied to the second and third signal input pad groups 10. The second orientation signal is applied to the first signal input pad group 10.

Specifically, as shown in FIG. 7, in the fifth embodiment of the disclosure, the liquid crystal display panel comprises three signal input pad groups 10, which are the first, second and third signal input pad groups 10. The first conductive glue strip 31 is connected to the third signal input pad group 10. The second conductive glue strip 32 is connected to the first and second signal input pad groups 10. Accordingly, to perform the orientation process, the first orientation signal is applied to the third signal input pad group 10. The second orientation signal is applied to the first and second signal input pad groups 10.

In summary, a liquid crystal display panel is provided in the disclosure. In the liquid crystal display panel, the signal input pads for receiving the same type of input signals are defined as one signal input pad group. The pitch between two adjacent signal input pad groups is determined to be greater than the pitch between two adjacent signal input pads in the same signal input pad group. The first and second conductive glue strips are respectively connected to different signal input pad groups and the first electrode portion and the second electrode portion on the color filter substrate. As a result, under the premise of ensuring good yield of orientation, the design space occupied by the signal input pads can be reduced. The complexity of the probe bar is simplified. The flexibility in tuning the orientation of the liquid crystal display panel is enhanced. An orientation method of a liquid crystal display panel is also provided in the disclosure. Under the premise of ensuring good yield of orientation, the design space occupied by the signal input pads can be reduced. The complexity of the probe bar is simplified. The flexibility in tuning the orientation of the liquid crystal display panel is enhanced.

In the foregoing, other corresponding modifications and variations may be made by those skilled in the art according to the technical solutions and technical ideas of the disclosure. All such modifications and variations should be included in the protection scope of the application.

What is claimed is:

1. A liquid crystal display panel, comprising:
an array substrate and a color filter substrate disposed opposite to each other;
wherein the array substrate comprises a plurality of signal input pad groups arranged apart from each other on a side of the array substrate facing the color filter substrate, wherein the color filter substrate comprises a first electrode portion and a second electrode portion arranged apart from each other on a side of the color filter substrate facing the array substrate;

wherein each of the plurality of signal input pad groups comprises at least one signal input pad, wherein signal input pads in the same group of the plurality of signal input pad groups are spaced apart from each other and are configured to receive the same type of input signals, wherein a pitch between two adjacent signal input pads in the same group of the plurality of signal input pad groups is less than a pitch between two of the plurality of signal input pad groups adjacent to each other;

wherein the first electrode portion corresponds to at least one of the plurality of signal input pad groups, and the second electrode portion corresponds to other of the plurality of signal input pad groups except the at least one of the plurality of signal input pad groups corresponding to the first electrode portion, wherein the first electrode portion and the second electrode portion are respectively electrically connected to corresponding signal input pad groups of the plurality of signal input pad groups through a first conductive glue strip and a second conductive glue strip, wherein the first conductive glue strip is connected to all signal input pads in the plurality of signal input pad groups corresponding to the first electrode portion, and wherein the second conductive glue strip is connected to all signal input pads in the plurality of signal input pad groups corresponding to the second electrode portion; and wherein each of the array substrate and the color filter substrate comprises a display region and a non-display region on a side of the display region, wherein the first electrode portion is in the non-display region of the color filter substrate, wherein the second electrode portion covers the display region of the color filter substrate and extends to the non-display region of the color filter substrate, and wherein the plurality of signal input pad groups is in the non-display region of the array substrate.

2. The liquid crystal display panel as claimed in claim 1, wherein the first electrode portion and the second electrode portion are respectively configured to receive a first orientation signal and a second orientation signal from a probe pin, and wherein the liquid crystal display panel is orientated through the first orientation signal and the second orientation signal.

3. The liquid crystal display panel as claimed in claim 1, wherein the non-display region of the array substrate further comprises a GOA circuit, and the signal input pads are electrically connected to the GOA circuit.

4. The liquid crystal display panel as claimed in claim 1, wherein the pitch between two adjacent signal input pads is greater than 0.5 mm and less than 5 mm, and wherein the pitch between two of the plurality of signal input pad groups adjacent to each other is greater than 5 mm and less than 20 mm.

5. An orientation method of a liquid crystal display panel, comprising:

step S1: providing a liquid crystal display panel, wherein the liquid crystal display panel comprises an array substrate and a color filter substrate disposed opposite to each other, wherein the array substrate comprises a plurality of signal input pad groups arranged apart from each other on a side of the array substrate facing the color filter substrate, wherein the color filter substrate comprises a first electrode portion and a second electrode portion arranged apart from each other on a side of the color filter substrate facing the array substrate, wherein each of the plurality of signal input pad groups comprises at least one signal input pad, wherein signal input pads in the same group of the plurality of signal input pad groups are spaced apart from each other and are configured to receive the same type of input signals, wherein a pitch between two adjacent signal input pads in the same group of the plurality of signal input pad groups is less than a pitch between two of the plurality of signal input pad groups adjacent to each other;

step S2: determining one of the plurality of signal input pad groups for receiving a first orientation signal and another of the plurality of signal input pad groups for receiving a second orientation signal;

step S3, connecting all signal input pads in the one of the plurality of signal input pad groups for receiving the first orientation signal to the first electrode portion through a first conductive glue strip, and connecting all signal input pads in the another of the plurality of signal input pad groups for receiving the second orientation signal to the second electrode portion through a second conductive glue strip; and step S4: applying the first orientation signal and the second orientation signal to the first electrode portion and the second electrode portion through a probe pin, and orientating the liquid crystal display panel through the first orientation signal and the second orientation signal;

wherein each of the array substrate and the color filter substrate comprises a display region and a non-display region on a side of the display region, wherein the first electrode portion is in the non-display region of the color filter substrate, wherein the second electrode portion covers the display region of the color filter substrate and extends to the non-display region of the color filter substrate, and wherein the plurality of signal input pad groups is in the non-display region of the array substrate.

6. The orientation method of a liquid crystal display panel as claimed in claim 5, wherein the non-display region of the array substrate further comprises a GOA circuit, and the signal input pads are electrically connected to the GOA circuit.

7. The orientation method of a liquid crystal display panel as claimed in claim 5, wherein the pitch between two adjacent signal input pads is greater than 0.5 mm and less than 5 mm, and wherein the pitch between two of the plurality of signal input pad groups adjacent to each other is greater than 5 mm and less than 20 mm.

8. A liquid crystal display panel, comprising:

an array substrate and a color filter substrate disposed opposite to each other;

wherein the array substrate comprises a plurality of signal input pad groups arranged apart from each other on a side of the array substrate facing the color filter substrate, wherein the color filter substrate comprises a first electrode portion and a second electrode portion arranged apart from each other on a side of the color filter substrate facing the array substrate;

wherein each of the plurality of signal input pad groups comprises at least one signal input pad, wherein signal input pads in the same group of the plurality of signal input pad groups are spaced apart from each other and are configured to receive the same type of input signals, wherein a pitch between two adjacent signal input pads in the same group of the plurality of signal input pad groups is less than a pitch between two of the plurality of signal input pad groups adjacent to each other;

wherein the first electrode portion corresponds to at least one of the plurality of signal input pad groups, and the second electrode portion corresponds to other of the plurality of signal input pad groups except the at least one of the plurality of signal input pad groups corresponding to the first electrode portion, wherein the first electrode portion and the second electrode portion are respectively electrically connected to corresponding signal input pad groups of the plurality of signal input pad groups through a first conductive glue strip and a second conductive glue strip, wherein the first conductive glue strip is connected to all signal input pads in the plurality of signal input pad groups corresponding to the first electrode portion, and wherein the second conductive glue strip is connected to all signal input pads in the plurality of signal input pad groups corresponding to the second electrode portion;

wherein each of the array substrate and the color filter substrate comprises a display region and a non-display region on a side of the display region, wherein the first electrode portion is in the non-display region of the color filter substrate, wherein the second electrode portion covers the display region of the color filter substrate and extends to the non-display region of the color filter substrate, and wherein the plurality of signal input pad groups is in the non-display region of the array substrate;

wherein the first electrode portion and the second electrode portion are respectively configured to receive a first orientation signal and a second orientation signal from a probe pin, wherein the liquid crystal display panel is orientated through the first orientation signal and the second orientation signal;

wherein the non-display region of the array substrate further comprises a GOA circuit, and the signal input pads are electrically connected to the GOA circuit; and wherein the pitch between two adjacent signal input pads is greater than 0.5 mm and less than 5 mm, and wherein the pitch between two of the plurality of signal input pad groups adjacent to each other is greater than 5 mm and less than 20 mm.

* * * * *